Jan. 26, 1954  V. O. HAUSWIRTH  2,667,024
MECHANICAL MEMORY APPARATUS FOR BEET TOPPERS OR THE LIKE
Filed Oct. 17, 1951
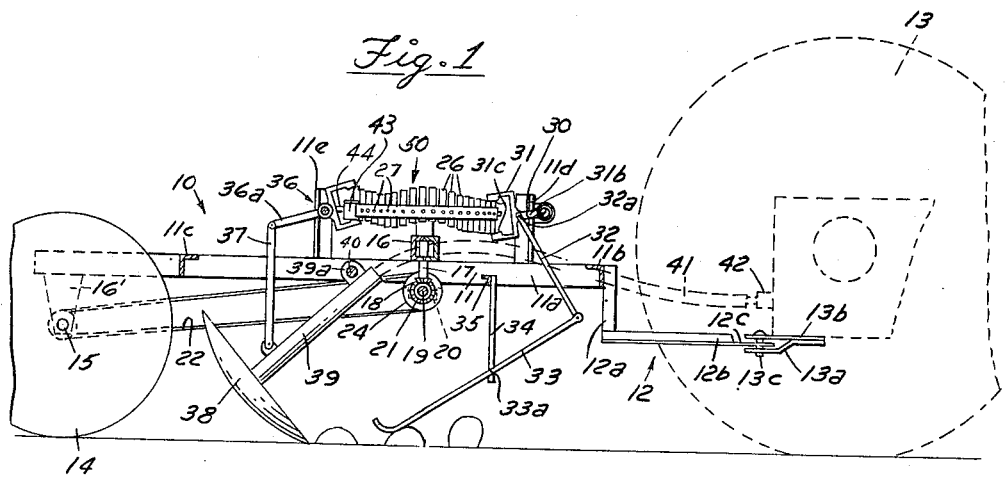
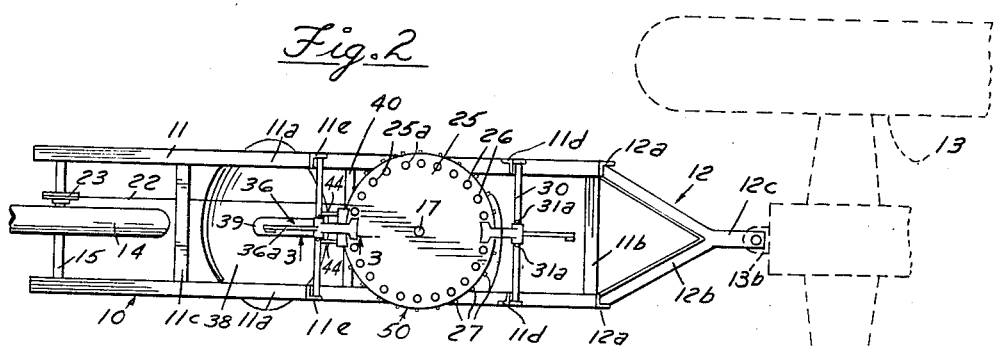
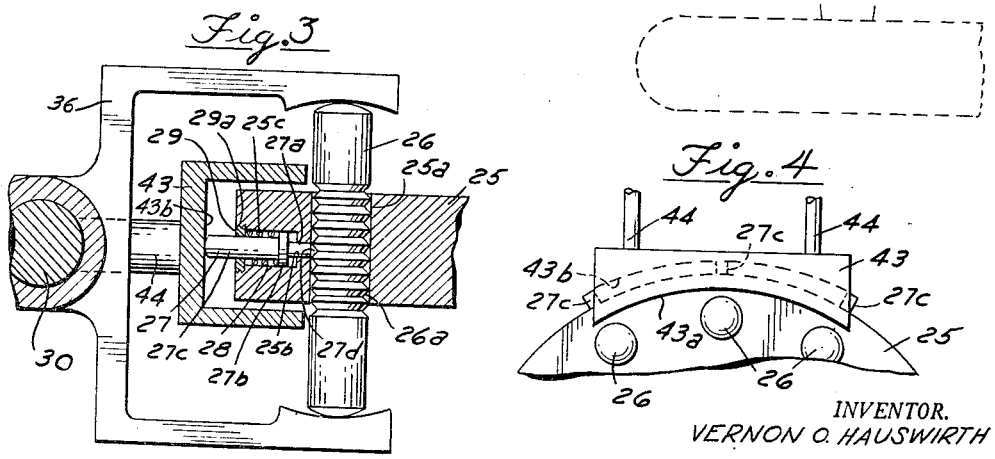
INVENTOR.
VERNON O. HAUSWIRTH
BY
W. A. Schaich
ATTORNEY Patented Jan. 26, 1954

2,667,024

UNITED STATES PATENT OFFICE 2,667,024

MECHANICAL MEMORY APPARATUS FOR BEET TOPPERS OR THE LIKE

Vernon O. Hauswirth, Royal Oak, Mich., assignor to Dearborn Motors Corporation, Birmingham, Mich., a corporation of Delaware Application October 17, 1951, Serial No. 251,767

11 Claims. (Cl. 56—121.4)

1

This invention relates to a mechanical device for predetermining the cutting height of a cutting tool wherein the cutting tool is moved to the preselected cutting height after an appreciable but predetermined delay.

It has long been a problem to conveniently and accurately position the cutting height of a cutting tool in a root crop harvester for topping the root crop without undue wastage of the root crop. While the operation of removing the top is in itself a simple operation, the whole process is complicated by the fact that the successive elements of the root crop do not project a uniform distance above the top of the ground. This is particularly true in the case of sugar beets wherein generally no two consecutive beets are at the same elevation above the ground surface, yet it is desirable to cut off about the same amount of top from each beet.

Heretofore beet topping devices have been provided wherein a feeler device was positioned slightly in advance of a cutting tool and through a mechanical or hydraulic linkage, the feeler device controlled the position of the cutting tool. However, this arrangement has two obvious disadvantages. In the first place, the force for moving the cutting device was generally derived directly from the feeler device, so that elaborate counterweighting arrangements had to be employed to minimize the vertical load carried by the feeler device. Secondly, since the feeler device necessarily had to precede the cutting element, the cutting element never accurately assumed a proper vertical position in relation to a particular beet passed over by the feeler device, for when the machine had advanced sufficiently to bring the cutting element to the particular beet, the feeler device was beyond such beet and at a different elevation.

Accordingly, it is an object of this invention to provide an improved tool height setting mechanism for a moving implement which will accurately set a cutting tool to a predetermined tool height so that a cut of proper height will be made when the tool has advanced to the cutting position.

Another object of this invention is to provide an improved tool height setting device for a root crop topping machine which preselects the working height of the cutting tool to sever about the same amount of top from successive elements of a root crop which project unevenly above the ground surface.

A further object of this invention is to provide a mechanical memory mechanism for correlating the position of a leading feeler device with the position of a trailing cutting or working tool on a traveling implement so that the vertical position of the working tool at every point along the line of travel of the implement is a function of the actual height of the feeler device when it was at the same point.

A further object of this invention is to provide a mechanical memory device which is economically manufacturable, positive in operation, and of sturdy construction to withstand rugged field operations.

The specific nature of this invention, as well as other objects and advantages thereof, will become apparent to those skilled in the art from the following detailed description taken in conjunction with the attached drawing on which, by way of preferred example only, is illustrated one embodiment of this invention.

On the drawings:

Figure 1 is a longitudinal sectional view through a root crop harvesting machine incorporating an improved tool height adjusting device constructed in accordance with this invention;

Figure 2 is a plan view of the machine shown in Figure 1;

Figure 3 is an enlarged sectional detail view taken along the plane 3—3 of Figure 2; and Figure 4 is an enlarged fragmentary plan view of the cam utilized for engaging the cam pin locking element with the cam pin.

As shown on the drawings:

While the invention about to be described is best applied to a root crop topping machine which is utilized for removing the tops of a root crop projecting above the ground, such device is not limited thereto but may be utilized with other devices wherein delayed operation of an element to perform a required function is required.

Accordingly, there is shown somewhat schematically in Figure 1, a beet topping machine 10 which comprises a substantially rectangular frame 11 of built up angle iron construction. Frame 11 has a pair of longitudinally disposed side members 11a separated at their forward ends by a transverse angle iron bar 11b respectively welded at its ends to the side members 11a. A second transverse angle shaped bar 11c is respectively welded at its ends to the side frame members 11a adjacent the rear ends thereof, as best shown in Figures 1 and 2. A built up tongue 12 comprising a pair of depending angle iron arms 12a are respectively welded to the forward ends of frame members 11a. A V-shaped member 12b has its diverging ends welded to the lower portions of the depending arms 12a and a bar-like tongue member 12c is secured by welding to the apex of V-shaped member 12b. The V-shaped member 12b projects forwardly and is horizontally disposed for connection between the clevis plates 13a and 13b of a tractor 13. A clevis pin 13c pivotally secures the tongue member 12c to tractor 13. The rear end of frame 11 is carried by a wheel 14. Wheel 14 is mounted on a shaft 15 which has its ends respectively journaled in a pair of depending plate-like brackets 16' which are secured by welding to the rear end portions of side frame members 11a.

Intermediate the ends of frame 11, there is secured to the top of such frame as by welding a transverse member or bar 16 of box-like construction. A shaft 17 is vertically journaled in the center of transverse member 16, as best shown in Figure 1. Shaft 17 projects downwardly below the bottom surface of transverse bar 16 and a small bevel gear 18 is suitably secured to the end of such shaft. A transverse shaft 19 has its ends respectively journaled in suitable bearing blocks 20 to the underside of the side frame members 11a. Shaft 19 has its axis radially aligned with the axis of vertical shaft 17. A bevel gear 21 is suitably secured on shaft 19 in cooperating relationship with bevel gear 21 so that vertical shaft 17 may be rotated when horizontal shaft 19 is rotated. Rotation of shaft 19 is effected by the ground wheel 14 which drives a belt or a chain 22. A suitable sprocket or belt pulley 23 is keyed or otherwise secured to shaft 15 adjacent the ground wheel 14 and a corresponding sprocket or pulley 24 is suitably non-rotatably secured to horizontal shaft 19 in longitudinal alignment with the sprocket or pulley 23 and chain or belt 22 respectively surrounds such sprockets or pulleys to effect driving of shaft 19.

A feeler member 33 or finder has its medial portion secured to the lower end of a depending arm 34, the arm 34 being suitably secured to a transverse bar 35 which has its ends respectively secured by welding to the side frame members 11a.

A rotary cutter 38 is provided for topping the root crop and comprises a dish shaped disc suitably secured to a shaft (not shown) journaled in a housing 39. Housing 39 has an integral lug 39a at its upper end which is pivotally mounted to a medial portion of a cross shaft 40 suitably transversely secured to the side frame members 11a. The cutter shaft journaled within housing 39 may be power driven by a flexible shaft 41, as indicated in dotted outline in Figure 1, connected to the power-take-off 42 of tractor 13.

The feeler member 33 or finder is operatively connected to rotary cutter 38 by a mechanical memory device 50 whereby the cutter 38 is vertically moved to a position determined by the feeler 33 but only after a delayed interval proportioned to permit the cutter to advance linearly to the position where the feeler member previously selected the cutter height.

The mechanical memory device 50 comprises a cam wheel 25 of relatively large diameter which is non-rotatably secured to the upper end of vertical shaft 17. Cam wheel 25 has a circle of equal angularly spaced vertical holes 25a around the periphery thereof. A plurality of cam rods 26 are respectively snugly inserted within the vertical holes 25a. Cam rods 26 are locked in a selected position of vertical adjustment by locking pins 27. Such pins are inserted within radial holes 25b provided on the outer edge of cam wheel 25 respectively disposed opposite vertical holes 25a and in communication with the vertical holes 25a. The radial holes 25b are counterbored, as shown at 25c in Figure 3, to permit the insertion of locking pin 27. Locking pin 27 has a reduced diameter portion 27a which slidably fits within the hole 25b. An enlarged diameter portion 27b is integrally formed on the reduced diameter portion 27a and such enlarged diameter portion slidably fits within the counterbore 25c. A head portion 27c integrally provided on locking pin 27 projects outwardly from the enlarged diameter portion 27b beyond the peripheral edge of cam wheel 25. A spring 28 surrounds the head portion 27c and one end thereof abuts portion 27b. Spring 28 normally biases locking pin 27 inwardly and to prevent displacement of spring 28 from counterbore 25c, an apertured nut 29 is screwed into a threaded counterbore 29a provided on the outer extremity of counterbore 25c. The reduced diameter portion 27a of locking pin 27 has a conical point 27d which cooperates with a plurality of annular serrations 26a provided on each cam rod 26 to yieldingly secure the cam rod in a selected position as will be later explained.

Adjacent the forward end of frame 11, there are provided a pair of upstanding angle arms 11d which are respectively welded to the side frame members 11a. A similar pair of upstanding arms 11e are secured by welding to the side frame members 11a at a medial portion thereof. The upright arms 11d transversely support a cross shaft 30 which has its ends respectively journaled in suitable brackets welded to the forward faces of the arms 11d. A selector yoke 31 is pivotally mounted on a central portion of cross shaft 30 and is so positioned by a pair of transverse pins 31a on such cross shaft. Yoke 31 straddles the forwardly facing edge of cam wheel 25 and overlies the cam rod circle and contacts the ends of the cam rods passing therebetween. The inner faces of the yoke arm ends are concaved slightly, as shown at 31c in Figure 1, so as to permit contact with the ends of cam rod 26 through the range of pivotal movement of the yoke 31. Yoke 31 has a forwardly projecting integrally formed arm 31b and a link 32 is pivotally secured by a bolt 32a to such arm in depending relationship. The lower end of link 32 is pivotally secured by a suitable bolt to the forward end of the feeler member 33 previously described.

A yoke 36 substantially identical to yoke 31 is similarly mounted between the uprights 11e. Yoke 36 has a rearwardly projecting arm 36a which corresponds to arm 31b. A depending link 37 is pivotally secured to the rear extremity of arm 36a and the lower end of link 37 is pivotally secured to the aforedescribed rotary cutter 38.

As was previously mentioned, this invention is particularly useful when applied to a topping machine for removing the tops of a root crop. Hence, when the tractor is aligned over a row of beets for example, as shown in Figure 1, the feeler member 33 will then rest on one of the beets. As the beets project varying heights from the ground surface, it is obvious, therefore, that the feeler member will be correspondingly pivoted vertically about its pivot point 33a on arm 34. Accordingly, as the tractor moves forwardly along the row, the feeler member will then be moved up and down. Thus, through the connection of link 32 with the arm 31b of yoke 31 and feeler member 33, yoke 31 is rocked about cross shaft 30. Note that this linkage places very little vertical loading on the feeler. The forward movement of tractor 13 will, of course, effect rotation of ground wheel 14 and hence cam wheel 25 will be rotated; thus the cam rods 26 carried by cam wheel 25 will pass between yoke 31. Pivotal movement of yoke 31 will then position the cam rods 26 vertically in the cam wheel as the cam wheel 25 rotates. As the yoke 31 is pivoted in accordance with the movement of feeler member 33, the successive cam rods 26, passing through yoke 31, will then be set to varying heights as determined by the movement of yoke 31. The bias of springs 28 is such as to lightly engage the conical points 27d with serrations 26a thereby serving to maintain such rods in the position selected by yoke 31 until locked in place as will be presently described. It will be evident, therefore, that yoke 31 will position the cam rods 26 into a cam path or track, the pattern of which is governed by the varying height of the beets and will, therefore, produce a movement of yoke 36 corresponding to that of yoke 31 as cam rods 26 pass through such yoke. Hence the rotary cutter 38 will be raised or lowered in accordance with, and as a function of, the movement of feeler member 33, but only after a delayed interval. It will also be appreciated that the speed of cam wheel 25 is proportioned as to permit a half revolution thereof to take place, from the time the feeler member 33 positions one of the cam rods 26 until such cam rod arrives at the cutter yoke 36 while the implement travels the horizontal distance between feeler member 33 and cutter 38. In other words, the cam wheel 25 rotates a half revolution from the time the feeler member 33 positions one of the cam rods 26 while cutter 38 travels linearly to arrive at the spot the feeler member had positioned that particular cam rod whereupon the cutter will be positioned at a height which is an exact function of the height of the feeler member when it was at the same spot.

In order to rock yoke 36, it will, of course, be necessary to vertically lock each of the cam rods 26 in the position selected by yoke 31 when such cam rod engages yoke 36. Accordingly, it is necessary to hold the locking pin 27 against axial displacement with conical point 27d in engagement with a selected one of the serrations 26a provided on cam rod 26. This is conveniently accomplished by an arcuate cam 43 which comprises essentially a U-shaped member having arcuately shaped forward edges 43a, as best shown in Figure 4. The arcuately shaped edges 43a are preferably described by an arc struck from the center of cam wheel 25. Cam 43 is horizontally mounted adjacent the rear edge of cam wheel 25, as best shown in Figures 2 and 4. A pair of rods 44 respectively secured as by welding to the rear face of cam 43 project rearwardly where they are respectively secured, as by welding, to the shaft supporting yoke 36. Cam 43 thus partially surrounds the rear edge of cam wheel 25. A cylindrical segment cam surface 43b is provided on the inside of cam member 43 and such surface is described by an arc of greater radius than that of the cam wheel 25 so that the entering and departing edges of cam surface 43b are spaced a greater distance from the peripheral edge of cam wheel 25 than is the center portion of such surface. Thus, the head portions 27c of locking pin 27 may readily enter cam 43, but as cam wheel 25 revolves, the cam surface 43b will hold the locking pins against outward displacement whereupon the conical end 27b of pin 27 will be locked in engagement with the opposite serrations 26a provided on cam rod 26.

From the above description, it will be clearly apparent that there is here provided a mechanical memory device which will accurately predetermine the height to which a cutting tool of an implement should be set in order that it will accurately sever the unwanted portion of a root crop.

Or, more broadly speaking, this invention provides a mechanical memory device which will accurately reproduce a displacement of one shiftable element as a proportional displacement of a second shiftable element occurring a predetermined time after the displacement of such first element.

It will, of course, be understood that many details of construction may be varied through a wide range without departing from the principles of this invention and it is, therefore, not the purpose to limit the patent granted hereon otherwise than necessitated by the scope of the appended claims.

I claim:

1. A mechanical memory device for transmitting displacements of a shiftable selector element to a shiftable working element after a delayed interval comprising a movable cam carrier, means for driving said cam carrier at a selected rate, a plurality of cam elements shiftably mounted on said cam carrier in consecutive array with respect to the direction of movement of said carrier, means operatively connected to said selector element for continuously positioning successive cam elements relative to said carrier in accordance with the instantaneous position of said selector element, thereby arranging said cam elements in a cam path, and means subsequently engageable by said cam elements successively and operatively connected to said working element for shifting said working element in accordance with said cam path.

2. The combination defined in claim 1 plus means for locking said cam elements against displacement relative to said cam carrier while said cam elements are engaged by said means for shifting said working element.

3. The combination defined in claim 2 wherein the means for locking said cam elements includes means for resiliently opposing displacement of said cam elements with respect to said cam carrier throughout the entire movement of said cam carrier.

4. A mechanical memory device for transmitting displacements of a shiftable selector element to a shiftable working element after a predetermined time delay comprising a rotatable cam wheel, means for driving said cam wheel at a selected rate, a plurality of cam elements shiftably mounted on said cam wheel in a circular array, means operatively connected to said selector element for continuously positioning successive cam elements relative to said cam wheel in accordance with the instantaneous position of said selector element, thereby arranging said cam elements in a cam path, and means subsequently engageable by said cam elements successively and operatively connected to said working element for shifting said working element in accordance with said cam path.

5. The combination defined in claim 4 plus means for positively locking said cam elements against displacement relative to said cam wheel while said cam elements are engaged by said means for shifting said working element.

6. In a machine having a movable member, a device for continuously adjusting the movable member to a preselected position comprising a cam holder having a plurality of adjustable cam elements, selector means for continuously and successively adjusting the cam elements to define a cam path in accordance with the movement of said selector means, and means operatively connecting the movable member with said cam path whereby said cam path imparts a movement to the movable member corresponding to the movement of said selector means but only after a predetermined interval.

7. In a row crop machine having a cutting element for topping root crops, a feeler member movably mounted on the machine, said feeler member being constructed and arranged to contact the root crop for movement in response to height variations in the root crop as the machine straddles and moves along the row; the improvements comprising a cam wheel having a plurality of movable cam elements, means for rotatably mounting said cam wheel on the machine, means for driving said cam wheel in timed relationship to the linear speed of the machine, means operable by said feeler member for respectively positioning said cam elements in said cam wheel proportionally to the height variations in the root crop, thereby defining a cam path, and means operable by the cam path defined by said cam elements to effect delayed vertical movement of the cutting element as preselected by said feeler member.

8. In a row crop machine having a frame and a cutting element vertically adjustably mounted on the frame for topping root crops, a feeler member mounted on the frame and constructed and arranged to contact the root crop for movement in response to height variations in the root crop as the machine moves along the row; a device for preselecting the cutting height of the cutting element comprising a cam wheel having a plurality of movable cam elements disposed in a circular array, means for rotatably mounting said cam wheel on the machine, means for driving said cam wheel in timed relationship to the linear speed of the machine, a selector yoke pivotally mounted on the frame, said selector yoke being constructed and arranged to respectively contact said cam elements as said cam wheel revolves, means for operatively connecting said selector yoke to said feeler member, whereby said selector yoke respectively positions said cam elements in said cam wheel proportionally to the height variations in the root crop to define a cam path, a cutter positioning yoke mounted on the frame constructed and arranged to contact said cam elements at a substantial angular distance from said selector yoke, and means operatively connecting said last mentioned yoke with the cutting element whereby said cam path imparts to said cutter positioning yoke a movement corresponding to that of the selector yoke but only after a delayed interval.

9. The combination defined in claim 8 plus means for locking said cam elements against displacement relative to said wheel as they pass between said cutter positioning yoke.

10. The combination defined in claim 8 wherein said cam wheel has a plurality of radially disposed holes in the peripheral edge thereof respectively communicating with said cam elements, plus locking means for said cam elements comprising a plurality of locking pins respectively slidably mounted in said radial holes of said cam wheel for limited longitudinal movement, said locking pins having point portions, spring means respectively biasing said locking pins in engagement with said cam elements, a plurality of serrations on said cam elements, and cam means adjacent said cutter positioning yoke engageable by said locking pins to positively hold each of said locking pins in rigid engagement with the corresponding cam rod while said cam rod passes through said cutter positioning yoke.

11. In a row crop machine having a frame, a cutting element mounted on the frame for topping root crops, and a feeler member mounted on the frame and constructed and arranged to contact the root crop for movement in response to height variations in the root crop as the machine moves along the row; a device for preselecting the cutting height of the cutting element comprising a cam wheel having a plurality of angularly spaced, vertical cam rods slidably mounted adjacent the peripheral edge thereof, means for rotatably mounting said cam wheel on the machine, means for driving said cam wheel in timed relationship to the linear speed of the machine, a selector yoke pivotally mounted on the frame, said selector yoke being constructed and arranged to respectively contact said cam rods as said cam wheel revolves, means for operatively connecting said selector yoke to said feeler member, whereby said feeler member respectively positions said cam rods in said cam wheel proportionally to the height variations in the root crop, thereby defining a cam path, a cutter positioning yoke mounted on the frame constructed and arranged to contact said cam rods at a substantial angular distance from said selector yoke, means for locking each of said cam rods in the position selected by said selector yoke as said cam rods pass through said cutter positioning yoke, and means operatively connecting said last mentioned yoke with the cutter element whereby said cam path imparts to said cutter positioning yoke a movement corresponding to that of the selector yoke but only after a delayed interval.

VERNON O. HAUSWIRTH.

References Cited in the file of this patent

UNITED STATES PATENTS

| Number | Name | Date |
| --- | --- | --- |
| 895,722 | Bungeroth | Aug. 11, 1908 |
| 908,790 | Mallam | Jan. 5, 1909 |
| 2,486,915 | Botimer | Nov. 1, 1949 |